United States Patent [19]
Decker et al.

[11] Patent Number: 6,061,501
[45] Date of Patent: May 9, 2000

[54] SYSTEM, METHOD AND PROGRAM FOR CONVERTING AN EXTERNALLY DEFINED FOUR COLORANT (CMYK) INTO AN EQUIVALENT FOUR DIMENSIONAL COLORANT DEFINED IN TERMS OF THE FOUR INKS (C'M'Y'K') THAT ARE ASSOCIATED WITH A GIVEN PRINTER

[75] Inventors: William Chesley Decker, Longmont, Colo.; Ho Chong Lee, Endicott, N.Y.; Jack Louis Zable, Niwot, Colo.

[73] Assignee: International Business Machines Corporation, Armonk, N.Y.

[21] Appl. No.: 08/823,597

[22] Filed: Mar. 25, 1997

[51] Int. Cl.[7] .............................. B41B 15/00; G03F 3/08; H04N 1/46; G06K 9/00
[52] U.S. Cl. .......................... 395/109; 395/109; 358/529; 358/504; 358/518; 382/167
[58] Field of Search ............................ 395/109; 358/529, 358/504, 518, 523; 382/167

[56] References Cited

U.S. PATENT DOCUMENTS

| | | | |
|---|---|---|---|
| 5,121,196 | 6/1992 | Hung | 358/75 |
| 5,243,414 | 9/1993 | Dalrymple et al. | 358/500 |
| 5,323,249 | 6/1994 | Liang | 358/518 |
| 5,377,025 | 12/1994 | Spaulding et al. | 358/518 |
| 5,481,380 | 1/1996 | Bestmann | 358/504 |
| 5,483,360 | 1/1996 | Rolleston et al. | 358/518 |
| 5,502,579 | 3/1996 | Kita et al. | 358/518 |
| 5,719,956 | 2/1998 | Ogatsu et al. | 382/167 |

FOREIGN PATENT DOCUMENTS 8-116456  5/1996  Japan ................ H04N 1/46

*Primary Examiner*—Edward L. Coles
*Assistant Examiner*—Twyler Lamb
*Attorney, Agent, or Firm*—R. Strimaitis; Monica D. Lee

[57] ABSTRACT

A system, method, and program of the invention determine a unique combination of four colorants (C'M'Y'K') of a given printer that is equivalent to an externally defined four colorant combination (CMYK) by having the same color values (e.g., $L^*a^*b^*$ values). $L^*a^*b^*$ values associated with each three component combination (CMY) with the fourth component value (K) equal to zero of the externally defined four colorant combination (CMYK) are used in an inversion/interpolation program The printer also prints out a matrix of predetermined varying combinations of the three colorants of the printer (CMY)p with the fourth colorant K equal to zero. $L^*a^*b^*$ values are measured for each patched. These values and the corresponding three colorant combination values are inputted into the inversion/interpolation program. For any given externally defined three colorant combination (CMY), or $L^*a^*b^*$ value, a corresponding three colorant combination (C'M'Y') of the printer can be determined from the inversion/interpolation program by matching $L^*a^*b^*$ values. Then, a fourth colorant, e.g., black, (K) of the externally defined four colorant combination is mapped to an equivalent fourth colorant (K') of the printer by matching color values (e.g., $L^*$). For example, the $L^*$ value is found for various percentages of the fourth colorant through standard tables where C=0, M=0, Y=0. The $L^*$ value is found for various percentages for the fourth colorant of the printer by printing varying percentages of the fourth component and measuring its $L^*a^*b^*$ values and, assuming $a^*$ and $b^*$ are near zero, using the $L^*$ value. As such, the conversion takes place in two steps, from CMY to C'M'Y' and from K to K'.

10 Claims, 5 Drawing Sheets

SYSTEM, METHOD AND PROGRAM FOR CONVERTING AN EXTERNALLY DEFINED FOUR COLORANT (CMYK) INTO AN EQUIVALENT FOUR DIMENSIONAL COLORANT DEFINED IN TERMS OF THE FOUR INKS (C'M'Y'K') THAT ARE ASSOCIATED WITH A GIVEN PRINTER

CROSS REFERENCE TO RELATED APPLICATION

This application is related by common inventorship and subject matter to copending Patent Application No. (Internal Docket Number BO9-96-020) entitled "A System, Method, and Program For Converting Three Dimensional Colorants To More Than Three Dimensional Colorants" filed on even date herewith, assigned to the Assignee hereof and entirely incorporated herein by this reference.

This application is related by common inventorship and subject matter to copending Patent Application No. (Internal Docket Number AM9-97-024) entitled "An Enhanced System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

This application is related by common inventorship and subject matter to copending Patent Application No. (Internal Docket Number AM9-97-026) entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer By Using A Three Dimensional To Four Dimensional Conversion Process" filed on even date herewith, assigned to the Assignee hereof and entirely incorporated herein by this reference.

BACKGROUND OF THE INVENTION

1. Field of the Invention

This invention relates to color printing, and more specifically, to converting a four dimensional color (CMYK), defined in terms of a standard or another printer, into an equivalent four dimensional color defined in terms of the colors (i.e., inks, toners, etc.) that are uniquely associated with a printer that is to perform the actual printing.

2. Description of the Related Art

For additive color processes such as used in display monitors, red, green, and blue are primary colors. In theory, mixing red, green, and blue light in various combinations can produce any color. For example, cyan is a mixture of green and blue and magenta is a mixture of red and blue. Black is the absence of any red, green, or blue; while white contains all three. A display monitor involves an additive process of light, and therefore, any color it produces can be defined in terms of red (R), green (G), and blue (B).

In a printing process, inks are typically deposited on white paper which already reflects the full amount of red, green, and blue. Instead of adding red, green and blue (RGB) together to produce any color, quantities of red, green, and blue are removed to produce a desired color. To do this, filters or inks have to be produced which filter individual primary colors, while not affecting the other two. The filter colors which accomplish this are the colors which are the complement of the primary colors. For example, yellow is the complement of blue. A blue filter, one which filters out blue light, passes red and green and thus appears yellow. Yellow ink can be thought of as an ink which removes blue. Thus, the complement of blue is yellow; the complement of red is cyan; and the complement of green is magenta. As such, cyan, magenta, and yellow are the primary colors in the subtractive color system and are known as the process colors in the printing industry.

Theoretically, with only three colors of ink: cyan (C), magenta (M) and yellow (Y), a printer could print any color. White can be obtained by putting no ink on the paper; and black can be obtained by putting cyan, magenta, and yellow on the paper, blocking all light. Realistically, however, the color obtained when placing cyan, magenta, and yellow on paper may not be pure black. It may be brownish. Consequently, black ink is typically added to the printing process color set. The black ink not only insures a richer black color, but it also reduces the amount of ink that has to be used to produce most colors. For example, if at any one place on the paper, quantities of C, M, and Y are placed, there will be a gray component which can be removed and replaced with black. This reduces the total amount of ink on the paper and produces better grays and blacks. In addition, it increases the gamut of the color set.

As a theoretical example of this process called black substitution or gray component removal, consider the following:

| A color requires | Cyan = 20% |
| | Magenta = 40% |
| | Yellow = 60% |

In theory, the above color has a 20% gray component, the least common denominator. As such, 20% of each color could be removed and replaced with 20% black. The following will theoretically produce the same color.

| New color mix | Cyan = 0% |
| | Magenta = 20% |
| | Yellow = 40% |
| | Black = 20% |

In the above example, 120 units of ink are replaced with 80 units of ink. Thus ink is saved. Colored inks usually cost more than black ink; thereby saving even more.

As shown above, color can be expressed in several ways. A color can be expressed in terms of percents of RGB (red, green, blue), CMY, (cyan, magenta, yellow) or CMYK (cyan, magenta, yellow, black). None of these color spaces, as they are called, are defined as to what color is produced by mixing combinations of each. Generally, these color spaces are referred to as being device dependent, since the color produced by a given CMYK mix on one printer will not produce the same color on another.

An attempt has been made in the United States to standardize the process color inks so that the colors can be predicted. A standard called SWOP (Specification for Web Offset Publication) has been published which standardized the process ink colors. Recently, the standard has been taken a step further and 928 combinations of CMYK have been defined as to what color will result in a device independent color space (CIE XYZ or CIE L*a*b*). In Europe, a standard called Euroscale has been developed for four different paper surfaces. SWOP and Euroscale are very close, but not exactly the same.

In 1931, the organization called the Commission Internationale L'Eclairge (International Commission of Lighting), the CIE, met to try to establish a system of device independent color, color based on human sight. While attempting to define RGB, problems arose which persuaded the members to process the data through a matrix transform which produced a color space called CIE XYZ or XYZ. Since the XYZ color space is based on the human perception of color, any two different colors, even though the spectrum of these two colors may be different, will be perceived as the same color by a human if the XYZ values are the same under given lighting conditions.

From the XYZ color space, additional color spaces have been derived. One of these is called CIEL*a*b*, pronounced C Lab, or L*a*b*. This color space is based on XYZ of the color referenced to XYZ of the light source or paper. Most specifications such as the SWOP standard are specified in terms of XYZ and L*a*b* under a light source such as daylight D50. It is a three component color space with each color specified in terms of L*, a*, and b*. L* specifies the lightness; and the hue and saturation are determined from the values of a* and b*.

As previously discussed, a display monitor involves an additive process of light, and therefore, any color it produces can be defined in terms of RGB. However, a printing process is a subtractive process since it is printing on white paper, and therefore, color printers use cyan (C), magenta (M), and yellow (Y) or cyan, magenta, yellow and black (K), i.e., CMY or CMYK, to produce various colors. However, input files, such as a display monitors, scanners or other information used to print images are typically defined using RGB. Some input files can be defined in terms of CMY or CMYK. Input files may also be defined in device independent terms such as XYZ or L*a*b. Therefore, a conversion process has to take place in order to convert RGB, XYZ, or L*a*b* of an input file into CMY or CMYK for printing.

If the input file is RGB, XYZ, or L*a*b*, it must be converted to CMY or CMYK. If the input file is CMY, the printer could print with CMY, but it may be more desirable to print using CMYK. If the input file is CMYK, no conversion is necessary.

3D to 3D Conversions

3-D color tables (such as CMY-to-L*a*b*) and transformations among 3-D color spaces are straight forward and unambiguous or unique within the color gamut of the printer; and therefore, inversion schemes (e.g. from L*a*b* to CMY) are available. These schemes involve measurements of color patches of varied color amounts at specified intervals (e.g. creating a 9×9×9 matrix, i.e., 729 patches) to form a CMY lattice and a corresponding L*a*b* (or other color space) lattice (corresponding to CMY 9×9×9 for the example given here). These primary lattices can be denoted by (CMY)p and (L*a*b*)p. An interpolation method is used to establish one-to-one correspondence between points in these lattices. The so called "color rendering dictionaries" are constructed using such interpolation algorithms. If such rendering dictionaries have been established, finding CMY for a given L*a*b value becomes a simpler task.

L*a*b* to CMY Conversion

Coordinates for device independent color space are specified in L*a*b*. However, printers typically use CMY colors. It is therefore necessary to convert from L*a*b* to CMY. Converting to CMY involves a three dimensional (3D) to three dimensional (3D) conversion process. It should be noted that well known, commonly used, methods can be used to perform 3D to 3D conversions, such as L*a*b* to CMY.

For example, a L*a*b* to CMY transfer involves making print sample patches using the printer for which the conversion is desired. The print patches are made up of combinations of C, M, and Y. Typically, there are nine patches of each (making a 9×9×9 sample layout having 729 patches) with each color at 0%, 12.5%, 37.5%, 50%, 62.5%, 75%, 87.5%, and 100%. For each one of the 729 patches the exact percent of cyan, magenta, and yellow is known. Then, each print sample, i.e., patch, is measured and its CIE L*a*b* calculated. A table is created having various percentages of CMY with its corresponding L*a*b* value. To express C, M and Y in terms of equal increments of L*a*b*, known inversion and interpolation techniques are employed. For any given L*a*b* value received as input, that L*a*b* value is located in the table and the corresponding percentages of CMY are found. If the same L*a*b* value is not in the table, interpolation is used or out-of-gamut mapping is used. Out-of-gamut mapping occurs if the L*a*b* value is beyond the volume or color space of colors that a printer is able to produce. Any L*a*b* value that lies within this volume is something that can actually be accurately reproduced by the printer. Since any given printer has its limitations and cannot print every possible color, out-of-gamut means that a given L*a*b* is outside the capability of the printer. There are many well-known out-of-gamut mapping techniques. Basically, these techniques try to get to the point on the surface of the color volume of the printer that is the closest color match.

RGB to CMY Conversion

Converting from RGB to CMY merely involves a process that represents the relationship between complementary colors. The subtractive color primaries cyan, magenta, and yellow are the complements of the additive primaries red, green, and blue. Therefore, in theory, the conversion is:

cyan=1.0—red magenta=1.0—green yellow=1.0—blue

For example, a color that is 0.2 red, 0.7 green, and 0.4 blue can also be expressed as 1.0−0.2=0.8 cyan, 1.0−0.7=0.3 magenta, and 1.0−0.4=0.6 yellow.

3D to 4D Conversions

CMY to CMYK Conversion

Converting from CMY to CMYK involves using black generation and under color removal to generate a black component. Under color removal reduces the amount of cyan, magenta, and yellow components to compensate for the amount of black that was added by the black generation. The percentage of black used is the minimum percentage that is used by cyan, magenta or yellow. The altered amount of CMY that is then used is the original amount minus the percentage amount used for black.

For example, for an input file defined in CMY, the conversion to C'M'Y'K is as follows:

K=min (C,M,Y)

C'=C−K

M'=M−K

Y'=Y−K

For this conversion, it is assumed that the inks are a perfect dye such that a mixture in equal amounts of CMY will produce black or a perfect gray, i.e., a block die. The above illustrates one way to convert CMY to CMYK.

A side effect from converting from CMY to CMYK is that the gamut may be reduced, i.e., the number of colors that are produced (the color space) may be reduced, due to loss of hue. This side effect can be compensated for by using an under color addition process. The under color addition process regains lost hues and expands the gamut. This process results in new percentages of CMYK noted below as C"M"Y"K". The process uses the following well-known formulas from classical theory:

$$C'' = \frac{C'}{1-K} = \frac{C-K}{1-K}$$

$$M'' = \frac{M'}{1-K} = \frac{M-K}{1-K}$$

$$Y'' = \frac{Y'}{1-K} = \frac{Y-K}{1-K}$$

$$K'' = K' = K$$

RGB to CMYK Conversion

A combination of processes including the RGB to CMY conversion and the CMY to CMYK conversion can be used to convert from RGB to CMYK.

L*a*b* to CMYK Conversion

This conversion involves the 3D interpolation scheme and out-gamut mapping scheme discussed above for transforming L*a*b* to CMY. This involved creating CMY patches (e.g., 9×9×9), measuring for L*a*b* values and interpolating, if necessary, to get a CMY value for a given L*a*b* input value. Then the above process for converting CMY to CMYK can be used.

The problem with the above conversion processes, especially the ones that convert CMY to CMYK, i.e., a 3D to 4D conversion, is that these processes are based on theoretical colors and color relationships. A printer may not be capable of producing such theoretical colors.

In addition, since printers typically have four colors, CMYK, for printing, but input files are typically defined using three color values (e.g., RGB, L*a*b*), an equivalent color set of more than three colors must be found for every color obtained with combinations of three primary colors. Transforming a three dimensional system to four or higher dimensions provides no unique solution. The well-known simple scheme described above is based on the ideal dies known as block dies which yields perfect black or grey (w/o hue) whenever equal amounts from C, M, and Y are overprinted over a given area. Then, for any given set of 3 primaries, an equal amount is removed from each color component and the same amount of black can be added without changing the color value. The amount of ink saved is twice the amount of black added. The amount of CMY replaced can vary from zero to the lowest of the three colorants—a fact which indicates that this process is not unique. For real colorants, combining equal amounts of three colorants will not result in ideal grey/black. Thus, the choice of black replacement becomes ambiguous.

U.S. Patent Application Serial Number (Internal Docket Number BO9-96-020) entitled "A System, Method, and Program For Converting Three Dimensional Colorants To More Than Three Dimensional Colorants" filed on even date herewith, assigned to the Assignee hereof and entirely incorporated herein by this reference, discloses a technique for converting from three colorants to four or more colorants. The technique takes into account the colors and L*a*b* values of the colors that a given printer is actually capable of printing. The technique also uses a fourth color substitution process that results in an unambiguous fourth color replacement percentage amount.

In some situations it is desirable to convert a four color combination (e.g., CMYK) to an equivalent four color combination of the same colors (CMYK). For example, the printing press industry has their own standard and specification for CMYK (e.g., SWOP standard). Each different standard and specification of CMYK will result in different L*a*b* values for a same percentage amount of CMYK. In addition, the L*a*b* values for a given CMYK combination defined by a standard will be different for that same CMYK combination that is printed by any given printer. This is because the various toners or inks used by printers will produce their own different L*a*b* values. Toners and inks having different formulations will produce differing L*a*b* values. Any color combination (e.g., CMYK) that is specified as having certain color values (e.g., L*a*b* values) which do not take into consideration the characteristics of the colors of the printer that is to perform the printing, is referred to herein as being externally defined. For example, an externally defined color combination (e.g., CMYK) may be specified by the SWOP standard, any other standard, or by the characteristics (inks/toners) of another printer (as would be done for a proofing application). In many cases, a printer job will be received in which the four dimensional colorant (CMYK) is externally defined. Therefore, the printer that is to perform the printing must convert the received externally defined CMYK values into equivalent CMYK values that take into consideration the colors (i.e., inks, toners, etc.) and capabilities of the given printer. A CMYK of a printer (C'M'Y'K') is equivalent to an externally defined CMYK if the L*a*b* values are the same.

Therefore, it is desirable to convert an externally defined CMYK to its corresponding L*a*b* values and to use these L*a*b* values to find an equivalent C'M'Y'K' combination for a given printer. This transformation can be depicted as $$(CMYK)_{STD} \to (L*a*b*)_{STD} = (L*a*b*)_{PTR} \to (C'M'Y'K')_{PRTR}$$

The problem is that there is not a one-to-one mapping from L*a*b* to CMYK. That is, there is not a unique combination of CMYK for a given L*a*b*.

SUMMARY OF THE INVENTION

It is therefore an object of this invention to convert an externally defined four dimensional colorant (CMYK) into an equivalent four dimensional colorant (C'M'Y'K') that takes into consideration the colors and capabilities of the given printer that is to perform the printing functions.

It is a further object of this invention to find a unique and equivalent combination of four colors of a printer (C'M'Y'K') from L*a*b* values specified for an externally defined four dimensional colorant (CMYK).

The system, method, and program of the preferred embodiment of this invention determine a unique combination of C'M'Y'K' of a given printer that is equivalent to an externally defined CMYK by having the same L*a*b* values.

Another technique for doing this is disclosed in copending Patent Application No. (Internal Docket Number AM9-97-024) entitled "An Enhanced System, Method, and Program For Converting An Externally Defined Four Dimensional Colorant' (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

The preferred embodiment of this invention and the preferred embodiment of the above described copending application both use the L*a*b* values associated with each CMY combination for each K value of the externally defined CMYK color combinations. These L*a*b* values may be published as a standard or they can be measured from patches printed out using inks that meet the externally defined specification. The L*a*b* values and corresponding CMY values at each K value are inputted into an inversion program.

Both preferred embodiments also map an externally defined K value to an equivalent K' value of the printer through matching the L* value, optical density, reflectance, or other equivalent color value. For convenience in describing these preferred embodiments, L* will be used for the color value. First, the L* value is found, such as from the tables published for a given standard, for each externally defined K value where C=0, M=0, and Y=0. Then, the given printer prints out a series of greyscale fourth color component (e.g., black) (K') patches for increments of percentages of black (K') ranging from 0% to 100%. The L* value for each of these greyscale patches is measured. The L* value and the corresponding externally defined K value are inputted into an interpolation program. The measured L* value and the corresponding K' value of each printed greyscale patch is also inputted into an interpolation program. For any given externally defined K value, an equivalent K' value can be determined from the interpolation program by matching the same corresponding L* value to both values.

In the preferred embodiment of this invention, a matrix of patches are printed out by the given printer using the inks/toners of the printer for which the conversion is desired. The matrix of patches have various combinations of varying percentages of each of the components of (C'M'Y')p with the percentage of K' at 0%. For example a 9×9×9 matrix of C'M'Y' at combinations of 0%, 12.5%, 25%, 37.5%, 50%, 62.5%, 75%, 87.5%, and 100% are printed out; although equal increments are not necessary. The L*a*b* values are then measured for each one of these patches. The L*a*b* values and the corresponding (C'M'Y')p combination at K'=0 are inputted into an inversion/interpolation program so that a corresponding C'M'Y' combination can be found for any given L*a*b* value corresponding to an externally defined CMY combination.

For any given externally defined CMYK combination, the conversion to a combination of C'M'Y'K' of the printer takes place in two parts.

The first part of the conversion transforms the values for CMY of the externally defined CMYK combination into an equivalent C'M'Y' combination for the printer. The values for CMY from the CMYK combination are used as input into the inversion/interpolation program, along with the corresponding L*a*b* values. The program finds the corresponding L*a*b* values for CMY where K=0 that were inputted into the program from the externally defined specification. These L*a*b* values are used in the program to determine corresponding C'M'Y' values for the printer, via inversion/interpolation, that produce the same L*a*b* values when printed by the printer.

The second part of the conversion transforms the value of K of the externally defined CMYK combination into an equivalent K' for the printer. The value for K from the CMYK combination is used as input into the interpolation program. The program finds the corresponding L* value for K that was inputted into the program from the externally defined specification. The L* value is used in the program to determine the corresponding K' value for the printer that would produce the same L* value when printed by the printer.

The C'M'Y' values determined from the first part of the conversion is combined with the K' value determined from the second part of the conversion resulting in C'M'Y'K' values for the printer that are equivalent to a given externally defined CMYK value.

The separate three dimensional (CMY) to three dimensional (C'M'Y') conversion and the separate one dimensional (K) to one dimensional (K') conversion will result in a unique solution.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

One solution to the above described problem can utilize a conversion technique that converts L*a*b* values into equivalent C'M'Y'K' values for a given printer as disclosed in U.S. Patent Application Serial Number (Internal Docket Number BO9-96-020) entitled "A System, Method, and Program For Converting Three Dimensional Colorants To More Than Three Dimensional Colorants" filed on even date herewith, assigned to the Assignee hereof and entirely incorporated herein by this reference. For each L*a*b* in a standard table or from another external specification, a corresponding C'M'Y'K' combination for a given printer is found by using the L*a*b*→CMY→CMYK conversion technique disclosed therein.

Another solution to the above described problem is disclosed in copending Patent Application No. (Internal Docket Number AM9-97-024) entitled "An Enhanced System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

The system, method, and program of this invention uses different techniques, than those described in the above described co-pending patent applications, to convert an externally defined four dimensional colorant (CMYK) into an equivalent four dimensional colorant (C'M'Y'K') which has the same L*a*b* values as the externally defined CMYK. The equivalent C'M'Y'K' results from the actual colors and capabilities of the given printer that is to perform the printing functions. A preferred embodiment is shown, described, and claimed in which the transform is performed by preserving the characteristics of the fourth (e.g., black) component.

Figure 1:
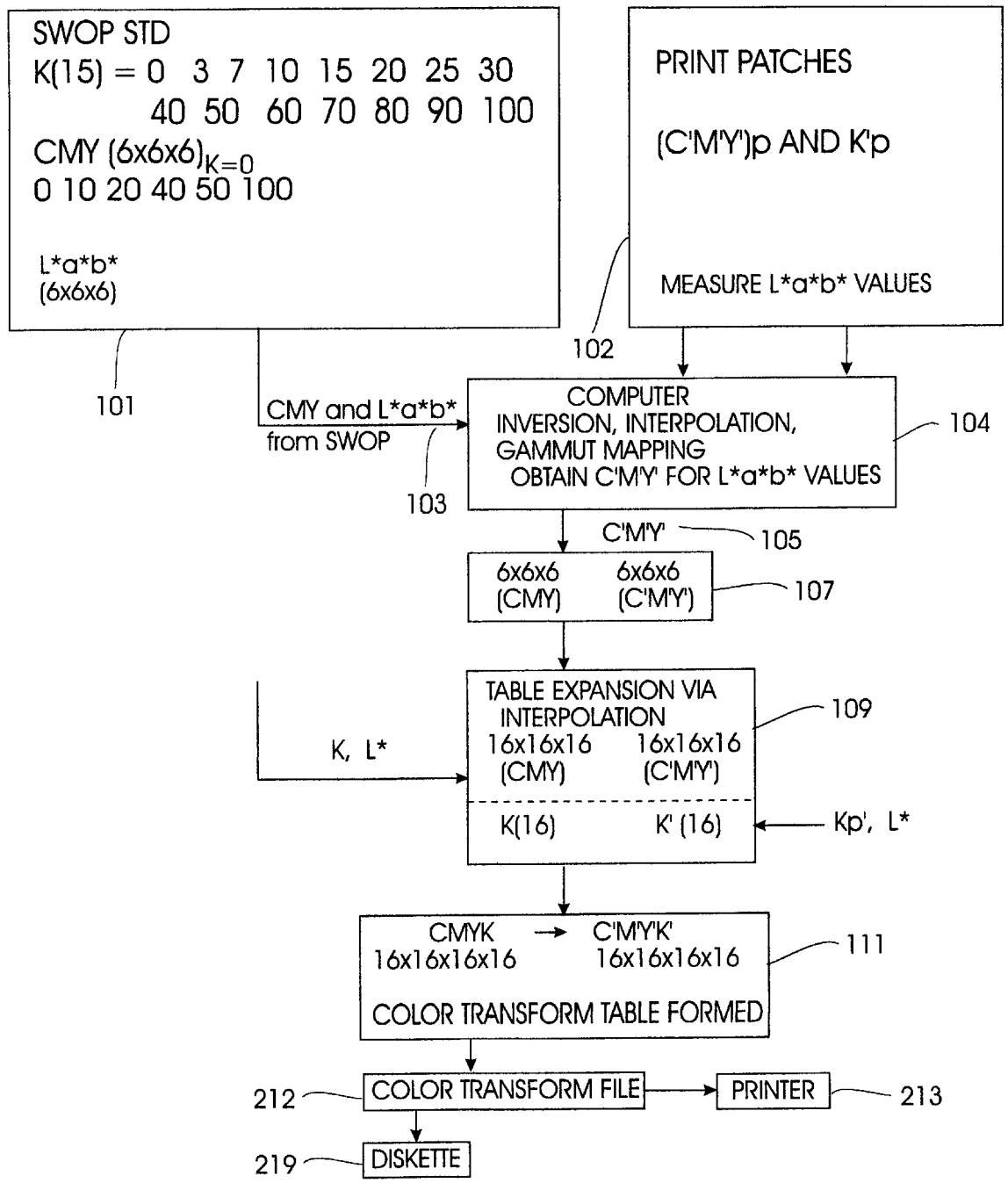
FIG. 1 is a flow chart showing the process steps of this invention.

The preferred embodiment described herein incorporates the following techniques as shown in FIG. 1. First, L*a*b* values are obtained for predetermined (i.e., known) combinations of varying percentages of each of the four components of CMYK that are externally defined, 101. These values may be obtained from a specification such as through published tables of the externally defined CMYK. For example, the SWOP standard publishes a table of $L^*a^*b^*$ values for varying percentages of CMYK. If such a table is not available, printed patches of predetermined combinations of varying percentages of each of the four components of CMYK that are externally defined may have to be obtained, such as from a printing press using printer's inks which match the standard. The $L^*a^*b^*$ values of each printed patch are then measured using a spectrophotometer or other color value measuring device. These $L^*a^*b^*$ values are then correlated with their corresponding CMYK values via a look up table and inversion/interpolation program.

It should be noted that some standards (e.g., SWOP) will publish tables having $L^*a^*b^*$ values for various combinations of CMY with K at a first value, then the same various combinations of CMY with K at a second value, etc. As such, the CMY values are varied independently of the K value. For example, C,M, and Y may have various combinations of 0%, 10, 20%, 40%, 70%, and 100%, resulting in a 6×6×6 matrix of CMY combinations, or 216 CMY combinations for each K value. For example, a first group of 216 CMY combinations at K=0, a second group of 216 CMY combinations at K=0.20, a third group of 216 CMY combinations at K=0.40, etc. The standard provides $L^*a^*b^*$ values for each CMY combination at each K value.

Step 102 of this embodiment involves using the printer for which an equivalent C'M'Y'K' is desired. The printer prints out patches of predetermined varying combinations of only three components (for example, a printer's cyan, magenta and yellow, (CMY)p or CpMpYp) of the four component colorant ((CMYK)p) where the fourth component (Kp) is equal to zero. Typically, a matrix of 9×9×9 (CMY)p patches are printed out by the printer using nine different percentages for each color component. For example, for cyan, there would be color patches having 0%, 12.5%, 37.5%, 50%, 62.5%, 75%, 87.5%, and 100% of cyan color. Each one of these percentages are combined with these same nine different percentages of magenta. In addition, each one of the 9×9 combinations of cyan and magenta are combined with these same nine different percentages of yellow to create the 9×9×9 color combinations. It should be noted that different percentage amounts than the ones listed above can be used. Also, the number of percentage amounts used can vary, thereby changing the size of the matrix of color combinations. The $L^*a^*b^*$ values of these patches are then measured using a spectrophotometer or other color value measuring device. The $L^*a^*b^*$ values and corresponding CpMpYp values are inputted into an inversion program, 104. Then for any given $L^*a^*b^*$ values 103, a corresponding C'M'Y' combination for the printer can be determined by inversion and interpolation, 104. (CMY→$L^*a^*b^*$→C'M'Y' defines this process.)

The printer also prints a series of greyscale fourth colorant (black) (Kp) patches, 102. Since the values of $a^*$ and $b^*$ are approximately zero for the greyscale black patches, only the $L^*$ value is used for the greyscale black patches.

For a given CMYK, (such as from the SWOP standard), the K value will be examined, e.g., assume K=0.4. One of the SWOP patches, or rows in the published tables, will have C=0, M=0, Y=0, and K=0.4, as the specification exists. The corresponding $L^*$ value for that K=.4 is found from the published tables or measured from a patch created from a printing press using the specified inks. Using this $L^*$ value, the percentage of K' of the printer will be determined that equals this $L^*$ value. The previously printed greyscale patches having various percentages of black (Kp values) and the corresponding $L^*$ values measured for each patch are used to find a percentage of K' of the printer that has the given $L^*$ value associated with K. In summary, a K value from the standard (where C=0, M=0, and Y=0) is used along with its corresponding $L^*$ value. This $L^*$ value is then used to determine a corresponding K' value for the printer. This transformation, from K (SWOP)-to-$L^*$-to-K'(printer) is determined via an interpolation program based upon input of all of the K values from the standard and the corresponding $L^*$ value of each K value, and upon input of each printed Kp percentage amount printed by the printer and the corresponding $L^*$ value measured for that Kp percentage.

Figure 5:
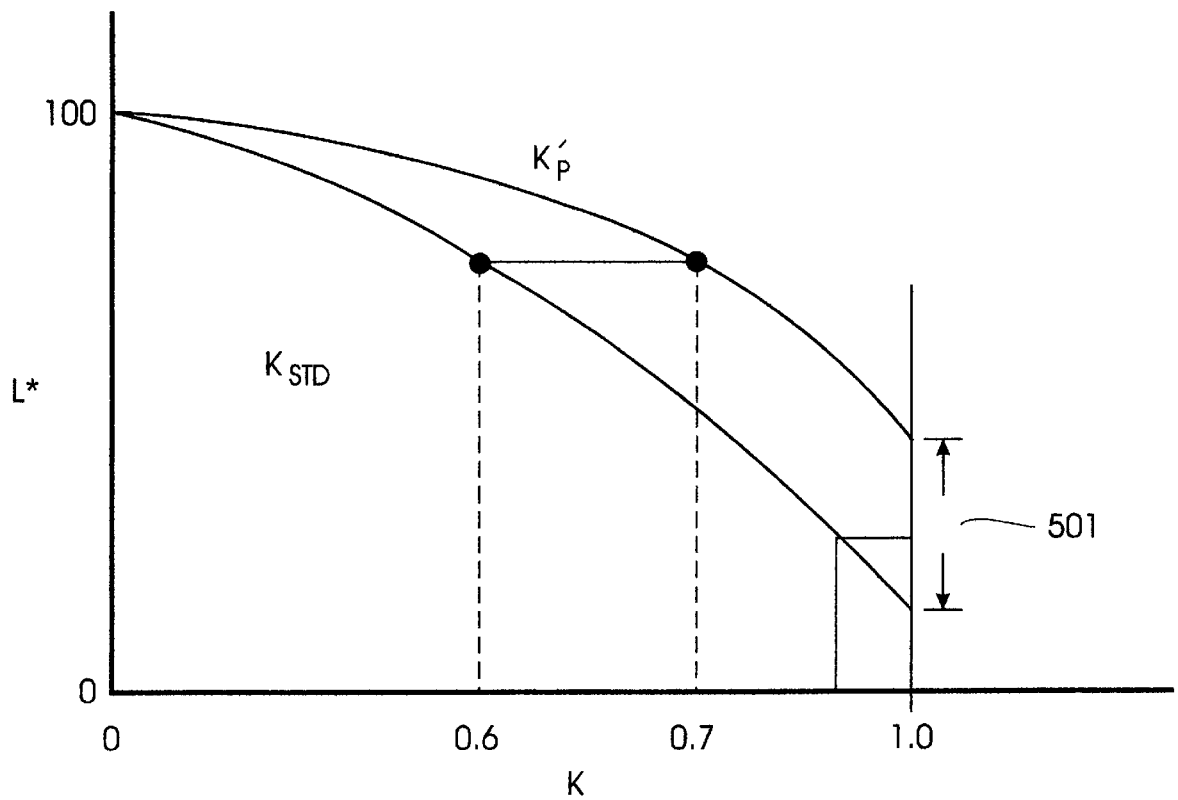
FIG. 5 is a plot, or mapping, of an externally defined fourth color component K and a fourth color component of the printer K'p.

A plot, as shown in FIG. 5, can be made of standard K ($K_{STD}$) and printer K' (K'p) from 0% (0) to 100% (1) and the corresponding $L^*$ value from 0 to 100. Reflectance could be used instead of $L^*$. Such a plot can be used to find a corresponding K' value for the printer for any given $L^*$ value or K value for the standard. It should be noted that the plot shown in FIG. 5 is not drawn to scale but is used herein merely for illustrative purposes. In certain situations, the printer may not be able to print the darkest K of the standard, but it will be matched best with K'=1, and the resulting error accepted. The mapped area where this applies is shown as area 501 of FIG. 5. Although the $L^*$ values for K and K' will not be the same for this area only, they will be nearly the same in this region. Nevertheless, K and K' in this region will be mapped to each other, i.e., correspond to each other, even though the $L^*$ values may not be the same. Nevertheless, the $L^*$ values will be nearly the same.

A look up table 107 having transformed C'M'Y' combinations for the printer in terms of $L^*a^*b^*$ is created from an inversion/interpolation program 104 having as its input the values for the predetermined varying combinations of (CMY)p in the patches printed by the printer and the corresponding measured ($L^*a^*b^*$)p values for each (CMY)p combination 102.

Each of the CMY combinations from the standard (where K=0) has corresponding $L^*a^*b^*$ values. These $L^*a^*b^*$ values are used as input to the look up table created above for the printer to find a corresponding transformed C'M'Y' combination of the printer. Alternatively, the inversion/interpolation program may be used to obtain C'M'Y' for $L^*a^*b^*$ of CMY without the step of generating $L^*a^*b^*$-to-C'M'Y' table. A relationship between any given CMY of the standard, and transformed C'M'Y' of the printer is then established, where K=0 and K'=0, by the transformations from CMY-to-$L^*a^*b^*$-to-C'M'Y'.

From the above steps, a transformation is made between K of the standard and K' of the printer, and between CMY of the standard and C'M'Y' of the printer where none of the CMY or C'M'Y' combinations contained any K, i.e., where K=0 and K'=0. Therefore, converting between CMYK of the standard to C'M'Y'K' of the printer, 111, comprises two overall processes of converting from K to K' separately and converting from CMY to C'M'Y' separately, 109. That is, the K value for the standard is converted to a K' value of the printer via the $L^*$ plots or tables, and the CMY values for the standard are converted to C'M'Y' values of the printer via the $L^*a^*b^*$ values. In the process, the black characteristics of the standard K is preserved. For a given CMYK that is externally defined via a standard or another printer, the $L^*a^*b^*$ values associated with the CMY values are used as input to an inversion/interpolation program to find corresponding C'M'Y' values for the printer, and the K value is used as input to an interpolation program using just the L* value to find a corresponding K' value for the printer. The C'M'Y' values for the printer together with the K' value for the printer form the equivalent C'M'Y'K' values.

In this preferred embodiment, instead of doing a four dimensional to four dimensional conversion (CMYK-to-C'M'Y'K') a three dimensional to three dimensional conversion (CMY-to-C'M'Y') is performed separately along with a separate one dimensional to one dimensional conversion (K-to-K'). A three dimensional to three dimensional conversion, along with a separate one dimensional to one dimensional conversion, will result in a unique solution.

Although 9×9×9 patches of Cp,Mp,Yp combinations are described above, any number of combinations of patches of Cp,Mp,Yp can be used. Furthermore, the color transform table developed, may have 1×m×n×o nodel points where l, m, n and o represent the number of values used for C, M, Y, and K, respectively. This color transform table can be further modified by increasing the number of nodel points for each color, creating a finer grid. For example, going from a 9×9×9×9 table (CMYK→C'M'Y'K') to a 16×16×16×16 table, 109. This latter step merely involves using interpolation algorithms to create the finer grid table. This new transform table will produce greater accuracy.

Figure 2:
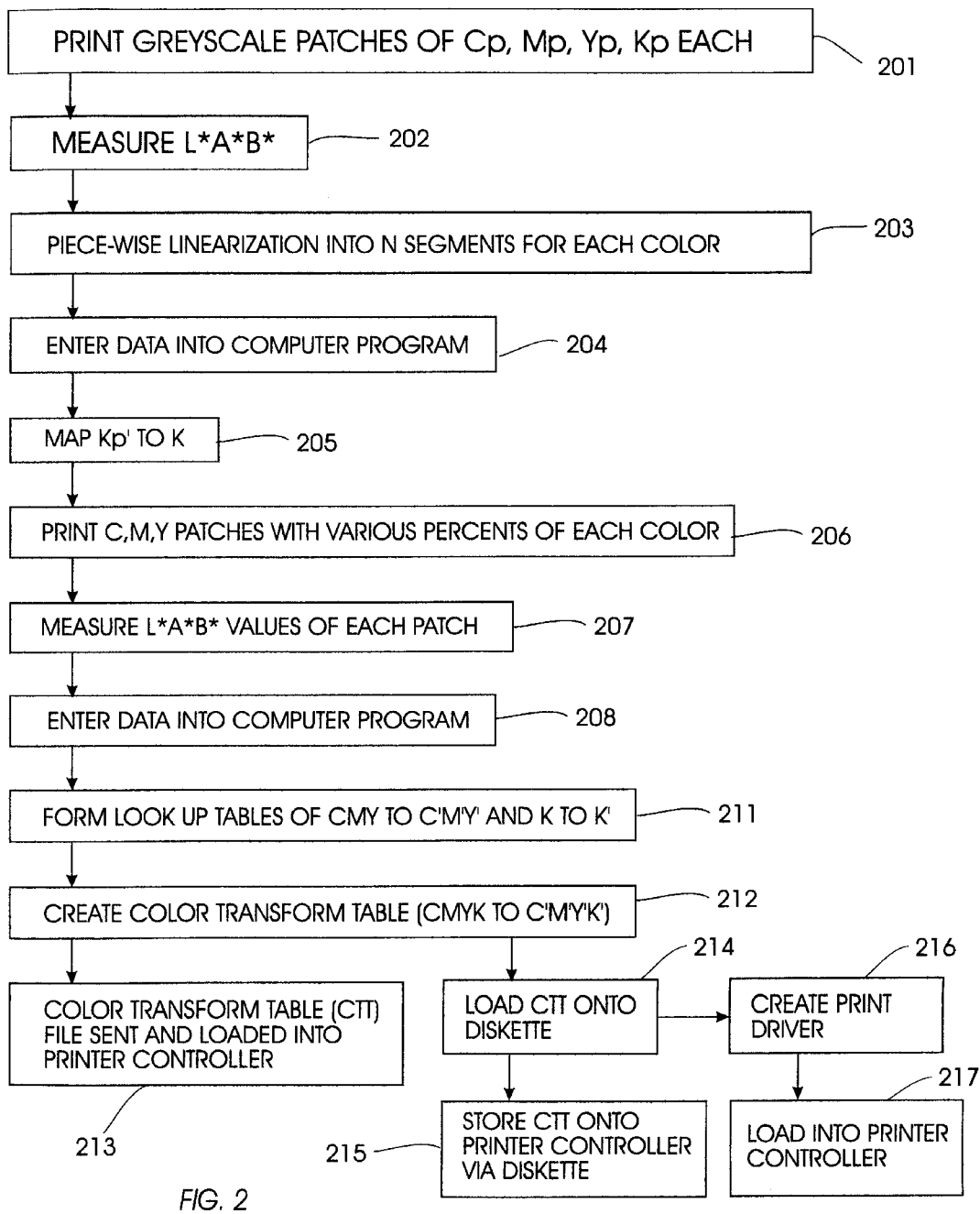
FIG. 2 illustrates a flow diagram of the process for creating a color transform table.

FIG. 2 illustrates a flow diagram of the process for creating a color transform table. First, greyscale patches are printed of each Cp, Mp, Yp, Kp, e.g., 50 steps each for a total of 200, step 201. The L*a*b* of each patch is measured and plotted, L* vs. percentage, step 202. Piece-wise linearization in L* into N segments (N=8 in the preferred embodiment) for each color is performed, step 203. Ideally, the segmentation selects intervals such that the curve is almost straight for L* as well as a* and b*. The data on K and Kp are entered into a computer program, step 204. A mapping is made between various printed greyscale values of Kp and externally defined K values based on corresponding L* values, step 205. Then (CMY)p patches with various percents, as determined in step 203, of each color (0–100%) with Kp=0 are printed, step 206. The (L*a*b*)p values of each of these (CMY)p patches at Kp=0 are measured, step 207. This data is then entered into a computer program, step 208. Look up tables are formed of CMY to C'M'Y' and K to K', step 211. A color transform table, (CMYK)-to-C'M'Y'K'), file is created, step 212. The color transform table file can then be sent and loaded into a printer controller 213 or loaded onto a storage medium such as a diskette, step 214. If the color transform table is stored on a storage medium, the color transform table can be permanently stored into the printer controller via the storage medium, or it can be loaded into the printer controller by the print driver as required by the print job, steps 214–217.

Figure 3:
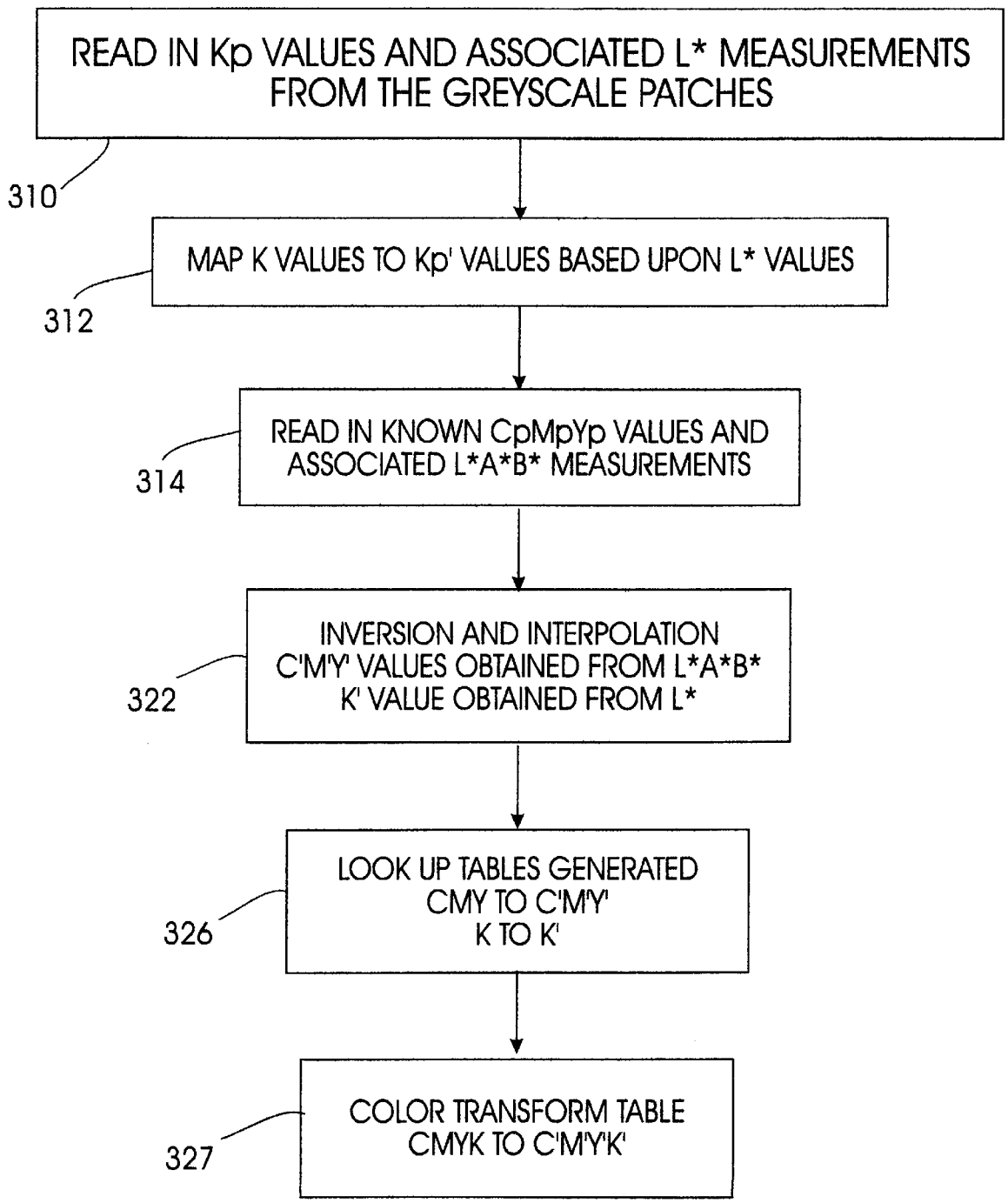
FIG. 3 is a computer program flow diagram for generating a look up table from an externally defined four dimensional color space (CMYK) to an equivalent four dimensional color space of a given printer (C'M'Y'K'), i.e., a color transform.

FIG. 3 is a computer program flow diagram for generating a look up table from an externally defined four dimensional color space (CMYK) to an equivalent four dimensional color space of a given printer (C'M'Y'K'). First, the Kp values and associated L*p measurements from the greyscale patches are read in, step 310. Then a mapping is made between the fourth component K' of the printer and a fourth component of an externally defined fourth component colorant K based upon corresponding L* values, step 312. Then the known CpMpYp values from the printed (CMY)p patches and associated (L*a*b*)p values are read in, also, step 314. Through inversion and interpolation, C'M'Y' values are obtained from L*a*b* values and K' values are obtained from L* values in equally spaced increments of C,M,Y,K, step 322. Then, a look up table is generated for CMY to C'M'Y' and K to K', step 326. Finally the four dimensional to four dimensional table, (CMYK) to (C'M'Y'K') is formed, step 327.

Figure 4:
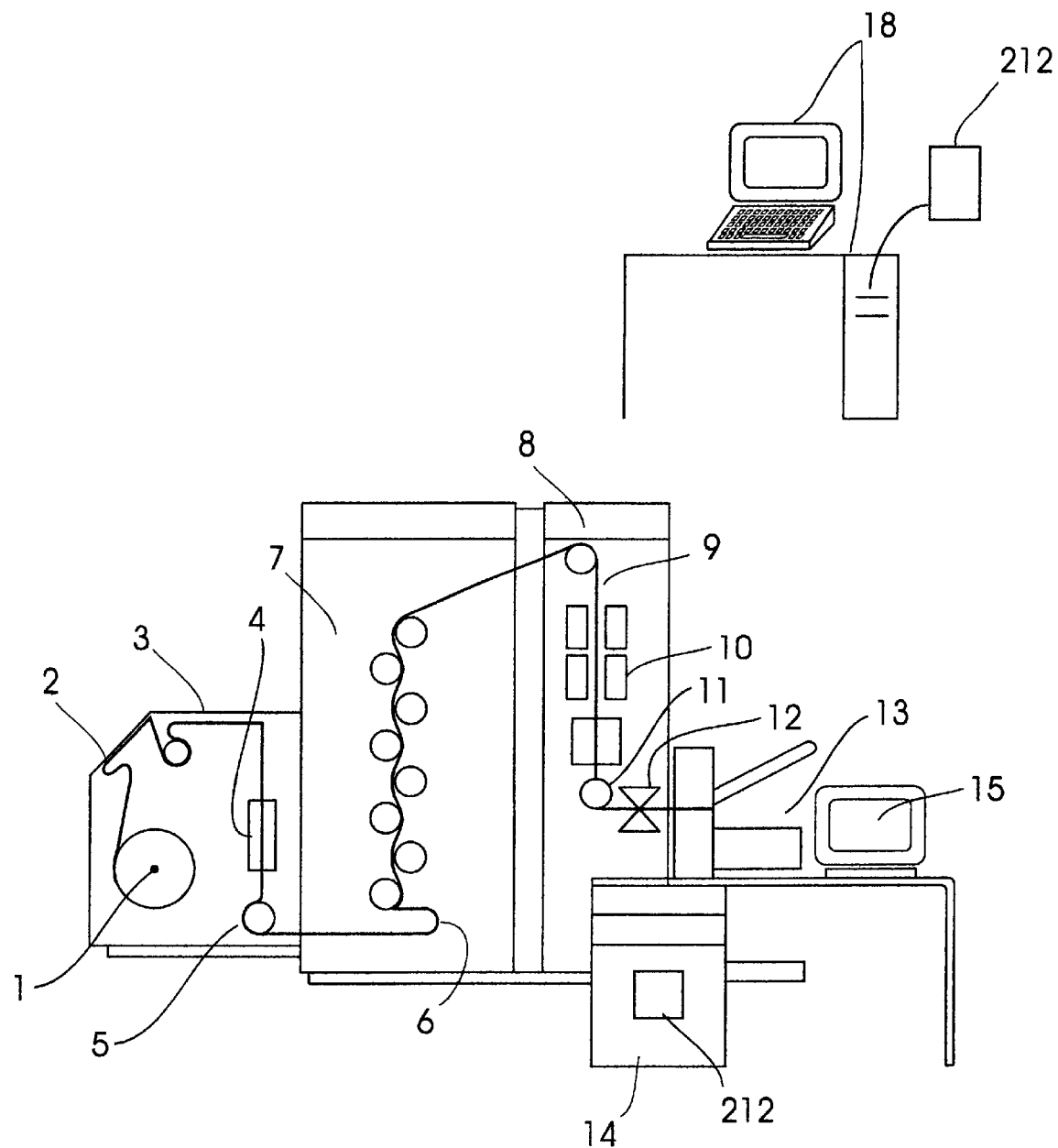
FIG. 4 is a block diagram of a printing system.

FIG. 4 is a block diagram showing a typical printing system for carrying out the features of the preferred embodiment of this invention. Also, this and other printing systems can be modified via the printer controller 14 to incorporate the features of the preferred embodiment of this invention. The printing system shown includes a paper reel 1, splicing table 2, paper drying roll 3, paper cooling 4, paper condition sensor 5, speed motor 6, printing stations 7, top roller 8, fuser 9, paper cooling 10, torque motor 11, cutter 12, and stacker 13. The printing station 7 comprises front and back printing engines for the various colors of ink used by the printer, such as cyan, magenta, yellow, and black. For more colors of ink, additional pairs of print engines would be contained within the printing station. The computer 18 is used to input the color transform table data as described to create a color transform table file, 212.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more printing systems and/or processing systems including, but not limited to, cpu, memory/storage devices, communication links, communication/transmitting devices, servers, I/O devices, or any subcomponents or individual parts of one or more printing systems and/or processing systems, including software, firmware, hardware or any combination or subcombination thereof, which embody the invention as set forth in the claims.

One skilled in the art of computer science will easily be able to combine the software created as described with appropriate general purpose or special purpose computer hardware and/or printer hardware to create a computer/printer system and/or computer/printer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

For example, any number of patches can be printed out and measured for its corresponding color value. A certain size matrix or specific percentage values are not required. Also, unequal increments of each color can be utilized, where the increments are based upon piecewise linear steps of each color. Although the invention has been described in terms of L*a*b*, any-color values, including device independent color values, can be used. As such, reference to L* can also be optical density or reflectance or other equivalent values. Also, although the invention has been described and claimed in terms of CMYK (which typically refers to cyan, magenta, yellow, and black), other colors can be used for any one or all of these color components. The invention is also applicable to five dimensional to five dimensional conversions, or more, without departing from the spirit and scope of the invention.

We claim:

1. A method for converting an externally defined four dimensional colorant (CMYK) into an equivalent four dimensional colorant (C'M'Y'K') having color components of a given printer, the method comprising:

transforming three components (CMY) of the externally defined four dimensional colorant (CMYK) into an equivalent combination of three colorants (C'M'Y') based upon measured L*a*b* values of varying combinations of the three colorants printed out by the printer;

transforming a fourth component (K') of the externally defined four dimensional colorant (CMYK) into an equivalent fourth component (K') of the given printer based upon measured L* values of varying percentages of a fourth colorant printed out by the printer; and combining the equivalent combination of three colorants C'M'Y' with the equivalent fourth component K' to form the equivalent four dimensional colorant (C'M'Y'K') having color components of the given printer wherein L*a*b* of (CMY) is closely matched with L*a*b* of (C'M'Y') and K of (CMYK) is closely matched with K' of (C'M'Y'K').

2. A method for converting an externally defined four dimensional colorant (CMYK) into an equivalent four dimensional colorant (C'M'Y'K') having color components of a given printer, the method comprising:

transforming three components (CMY) of the externally defined four dimensional colorant (CMYK) into an equivalent combination of three colorants (C'M'Y') of the given printer based upon measured L*a*b* values of various combinations of (CMY)p printed out by the printer when Kp=0 and on externally defined L*a*b* values for various combinations of CMY when K=0, whereby the equivalent combination of C'M'Y' has a same L*a*b* value corresponding to the three components (CMY) when K=0 of the externally defined four dimensional colorant (CMYK);

transforming a fourth component (K) of the externally defined four dimensional colorant (CMYK) into an equivalent fourth component (K') of the given printer based upon measured L* values of various percentages of Kp printed out by the printer and on externally defined L* values for various percentages of K when C=0, M=0, and Y=0, whereby the equivalent K' component has a same or nearly the same L* value as the K component when C=0, M=0, and Y=0 of the externally defined four dimensional colorant (CMYK); and combining the equivalent combination of C'M'Y' components with the equivalent K' component to form the equivalent four dimensional colorant (C'M'Y'K') having color components of the given printer, resulting in close matches between L*a*b* of (CMY) in (CMYK) and (C'M'Y') of (C'M'Y'K') and between L* of K in (CMYK) and K' of (C'M'Y'K').

3. A method for converting an externally defined four dimensional colorant (CMYK) into an equivalent four dimensional colorant (C'M'Y'K') having color components of a given printer, the method comprising:

using measured L*a*b* values of patches, printed out by the printer, having combinations of varying percentages of three color components (CMY)p of the printer when a fourth color component (Kp) of the printer has a zero percentage value, to determine, via inversion and interpolation from L*a*b* to C'M'Y', an equivalent three color component combination (C'M'Y') of the printer that has L*a*b* values equal to three of the colorants (CMY) when the fourth colorant (K) has a zero value of the externally defined four dimensional colorant (CMYK);

using measured L* values of patches, printed out by the printer, having varying percentages of the fourth color component (Kp) of the printer, to determine an equivalent fourth color component of the printer that has an L* value equal to the fourth color component (K), when C=0, M=0, and Y=0, of the externally defined four dimensional colorant (CMYK); and combining the determined equivalent three color component combination (C'M'Y') and the determined equivalent fourth color component (K') of the printer to form the equivalent four dimensional colorant C'M'Y'K'.

4. A method for converting an externally defined four dimensional colorant (CMYK) into an equivalent four dimensional colorant (C'M'Y'K') having color components of a given printer, the method comprising:

inputting, into a computer program, L*a*b* values externally defined for the four dimensional colorant (CMYK) and corresponding values of CMY combinations for K=0 for the externally defined four dimensional colorant;

correlating an externally defined K value to an equivalent K' value of the printer by using the L* value externally defined for the K value when C=0, M=0, and Y=0;

printing out a matrix of patches having predetermined combinations of varying percentages of three color components Cp, Mp, and Yp ((CMY)p) of the printer when a fourth color component of the printer Kp is equal to a zero value;

measuring the L*a*b* values of (CMY)p combination; inputting, into the computer program, the L*a*b* values of each combination of (CMY)p; and corresponding values of the predetermined combinations of (CMY)p;

using the computer program to determine a converted C'M'Y' combination having same L*a*b* values as three of the components when K=0 of the externally defined four dimensional colorant CMYK; and using the equivalent K' value correlated to the externally defined K value of the externally defined four dimensional colorant (CMYK) with the determined converted C'M'Y' combination to create a C'M'Y'K' combination equivalent to the externally defined four dimensional colorant (CMYK).

5. A system for converting an externally defined four dimensional colorant (CMYK) into an equivalent four dimensional colorant (C'M'Y'K') having color components of a given printer, the system comprising:

means for transforming three components (CMY) of the externally defined four dimensional colorant (CMYK) into an equivalent combination of three colorants (C'M'Y') based upon measured L*a*b* values of various combinations of the three colorants printed out by the printer where (CMY) and C'M'Y' correspond to the same L*a*b* values;

means for transforming a fourth component (K) of the externally defined four dimensional colorant (CMYK) into an equivalent fourth component (K') of the given printer based upon measured L* values of varying percentages of a fourth colorant printed out by the printer where K and K' have the same or nearly the same L* value; and means for combining the equivalent combination of C'M'Y' components with the equivalent K' component to form the equivalent four dimensional colorant (C'M'Y'K') having color components of the given printer.

6. A system for converting an externally defined four dimensional colorant (CMYK) into an equivalent four dimensional colorant (C'M'Y'K') having color components of a given printer, the system comprising:

means for transforming three components (CMY) of the externally defined four dimensional colorant (CMYK) into an equivalent combination of three colorants (C'M'Y') of the given printer based upon measured L*a*b* values of various combinations of (CMY)p printed out by the printer and on externally defined L*a*b* values for various combinations of CMY when K=0, whereby the equivalent combination of C'M'Y' has a same L*a*b* value as the three components (CMY) when K=0 of the externally defined four dimensional colorant (CMYK) when K can be any value;

means for transforming a fourth component (K) of the externally defined four dimensional colorant (CMYK) into an equivalent fourth component (K') of the given printer based upon measured L* values of various percentages of Kp printed out by the printer and on externally defined L* values for various percentages of K when C=0, M=0, and Y=0, whereby the equivalent K' component has a same L* value as the K component when C=0, M=0, and Y=0 of the externally defined four dimensional colorant (CMYK) when C, M, and Y can be any value; and means for combining the equivalent combination of C'M'Y' components with the equivalent K' component to form the equivalent four dimensional colorant (C'M'Y'K') having color components of the given printer.

7. A printing system having means for converting an externally defined four dimensional colorant (CMYK) into an equivalent four dimensional colorant (C'M'Y'K') having color components of the printer, the printing system comprising:

means for printing out a matrix of patches having predetermined combinations of varying percentages of three color components Cp, Mp, and Yp of the printer when a fourth color component of the printer Kp is equal to a zero value;

means for printing out a plurality of patches having predetermined varying percentages of the fourth color component (Kp) of the printer when each of the other three color components have a zero value;

means for transforming a fourth component (K) of the externally defined four dimensional colorant (CMYK) into an equivalent fourth component (K') of the given printer based upon measured L* values of the plurality of patches and on externally defined L* values for various percentages of K when C=0, M=0, and Y=0, whereby the equivalent fourth component (K') has a same L* value as the K component when C=0, M=0, and Y=0 of the externally defined four dimensional colorant (CMYK) when C, M, and Y can be any value;

means for transforming three components (CMY) of the externally defined four dimensional colorant (CMYK) into an equivalent combination of three colorants (C'M'Y') of the given printer based upon measured L*a*b* values of the matrix of patches and on externally defined L*a*b* values for various combinations of CMY when K=O, whereby the equivalent combination of C'M'Y' has same L*a*b* values as the three components (CMY) when K=0 of the externally defined four dimensional colorant (CMYK) when K can be any value; and means for printing a combination of the equivalent combination of three colorants (C'M'Y') and the equivalent fourth component (K') in response to input received in terms of the externally defined four dimensional colorant (CMYK).

8. A system for converting an externally defined four dimensional colorant (CMYK) into an equivalent four dimensional colorant (C'M'Y'K') having color components of a given printer, the system comprising:

means for printing out a matrix of patches having predetermined combinations of varying percentages of three color components Cp, Mp, and Yp of the printer when a fourth color component of the printer Kp is equal to a zero value;

means for printing out a plurality of patches having predetermined varying percentages of the fourth color component (Kp) of the printer when each of the other three color components have a zero value;

a computer program, loaded into a computer, having means for receiving as input a) measured L* values for each of the plurality of patches having predetermined varying percentages of the fourth color component (Kp), and b) externally defined L* values for varying percentages of the externally defined fourth colorant (K), and having means for creating a first file that correlates a given externally defined fourth colorant with a corresponding fourth color component of the printer based upon the received input;

the computer program, loaded into the computer, having means for receiving as input a) measured L*a*b* values of each patch of the matrix of patches having the three color components printed by the printer, and b) externally defined L*a*b* values for combinations of varying percentages of the other three color components externally defined, and having means for creating a second file that correlates a given externally defined three colorants of a given externally defined four component colorant with a corresponding combination of three color components of the printer through inversion and interpolation (CMY to L*a*b* to C'M'Y', where CMY and C'M'Y' are associated with the same L*a*b* values) of L*a*b* corresponding to externally defined (CMY); and a printer controller for transforming the externally defined four dimensional color component into the corresponding combination of three color components of the printer and the corresponding fourth color component based upon the second and first files created by the computer and loaded into the printer controller.

9. A file, on a medium for use in a printer controller of a printer, for converting an externally defined four dimensional colorant (CMYK) into an equivalent four dimensional colorant C'M'Y'K') having color components of the printer, the file comprising:

means for transforming three components (CMY) of the externally defined four dimensional colorant (CMYK) into an equivalent combination of three colorants (C'M'Y') based upon measured $L^*a^*b^*$ values of various combinations of the three colorants printed out by the printer that match the $L^*a^*b^*$ values associated with externally defined CMY;

means for transforming a fourth component (K) of the externally defined four dimensional colorant (CMYK) into an equivalent fourth component (K') of the given printer based upon measured $L^*$ values of varying percentages of a fourth colorant printed out by the printer where K and K' have the same or nearly the same value of $L^*$; and means for combining the equivalent combination of C'M'Y' components with the equivalent K' component to form the equivalent four dimensional colorant (C'M'Y'K') having color components of the given printer.

10. A program, on a computer usable medium, for generating a file for use in a printer controller of a printer for converting an externally defined four dimensional colorant (CMYK) into an equivalent four dimensional colorant (C'M'Y'K') having color components of the printer, the program comprising:

means for first receiving as input measured $L^*$ values for each of a plurality of patches, printed by the printer, having varying percentages of a fourth colorant (Kp) of the printer;

means for second receiving as input externally defined $L^*$ values for varying percentages of the externally defined fourth colorant (K);

means for providing a first correlation between a given externally defined fourth colorant and a corresponding fourth color component of the printer by determining matching $L^*$ values based upon the first and second received input;

means for third receiving as input measured $L^*a^*b^*$ values of each patch of a matrix of patches, printed by the printer, having predetermined combinations of varying percentages of each one of three other colorants of the printer;

means for fourth receiving as input externally defined $L^*a^*b^*$ values for combinations of varying percentages of the other three color components externally defined; and means for providing a second correlation, separate from the first correlation, between a given externally defined three colorants of a given externally defined four component colorant and a corresponding combination of three color components of the printer by determining matching $L^*a^*b^*$ values based upon the third and fourth received input.

* * * * *

UNITED STATES PATENT AND TRADEMARK OFFICE
CERTIFICATE OF CORRECTION

PATENT NO.    : 6,061,501
DATED          : May 9, 2000
INVENTOR(S)   : W. Decker et al.

It is certified that error appears in the above-identified patent and that said Letters Patent is hereby corrected as shown below:

Title page,
Line 3, delete "FOUR COLORANT (CMYK) INTO AN" and insert --FOUR DIMENSIONAL COLORANT (CMYK) INTO AN--.

Column 1,
Line 3, delete "FOUR COLORANT (CMYK) INTO AN" and insert --FOUR DIMENSIONAL COLORANT (CMYK) INTO AN--.

Lines 13-14, delete "copending Patent Application No. (Internal Docket Number BO9-96-020) entitled" and insert --copending Patent Application No. 08/823,596 now issued as Patent No. 5,987,168 and copending Patent Application No. 09/371,910 both entitled--.

Lines 20-21, delete "copending Patent Application No. (Internal Docket Number AM9-97-024)" and insert --copending Patent Application No. 08/823,731--.

Lines 30-31, delete "copending Patent Application No. (Internal Docket Number AM9-97-026)" and insert --copending Patent Application No. 08/823,734--.

Column 5,
Lines 54-55, delete "U.S. Patent Application Serial Number (Internal Docket Number BO9-96-020) entitled" and insert --U.S. Patent Application Serial Number 08/823,596 now issued as Patent No. 5,987,168 and U.S. Patent Application Serial Number 09/371,910 both entitled--.

Column 6,
Line 55-57, delete "copending Patent Application No. (Internal Docket Number AM9-97-024)" and insert --copending Patent Application No. 08/823,734--.

UNITED STATES PATENT AND TRADEMARK OFFICE
CERTIFICATE OF CORRECTION

| | |
|---|---|
| PATENT NO. : 6,061,501 | |
| DATED : May 9, 2000 | |
| INVENTOR(S) : W. Decker et al. | |

It is certified that error appears in the above-identified patent and that said Letters Patent is hereby corrected as shown below:

Column 8,
Lines 34-35, delete "U.S. Patent Application Serial Number (Internal Docket Number BO9-96-020) entitled" and insert --U.S. Patent Application Serial Number 08/823,596 now issued as Patent No. 5,987,168 and U.S. Patent Application Serial Number 09/371,910 both entitled--.

Lines 45-46, delete "copending Patent Application No. (Internal Docket Number AM9-97-024)" and insert --copending Patent Application No. 08/823,731--.

Column 14,
Line 62, delete "components when" and insert --components CMY when--.

Column 17,
Line 10, delete "colorant C'M'Y'K')" and insert --colorant (C'M'Y'K')--.

Signed and Sealed this

Seventh Day of August, 2001

*Attest:*

*Attesting Officer*

NICHOLAS P. GODICI
*Acting Director of the United States Patent and Trademark Office*